(12) United States Patent
Devillard

(10) Patent No.: US 10,866,876 B2
(45) Date of Patent: Dec. 15, 2020

(54) DYNAMICALLY CONFIGURABLE OPERATION INFORMATION COLLECTION

(71) Applicant: Amazon Technologies, Inc., Seattle, WA (US)

(72) Inventor: Emmanuel Pierre Devillard, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 35 days.

(21) Appl. No.: 16/416,051

(22) Filed: May 17, 2019

(65) Prior Publication Data

US 2019/0272190 A1 Sep. 5, 2019

Related U.S. Application Data

(62) Division of application No. 15/372,081, filed on Dec. 7, 2016, now Pat. No. 10,296,365.

(51) Int. Cl.
*G06F 9/455* (2018.01)
*G06F 11/34* (2006.01)
*G06F 11/30* (2006.01)

(52) U.S. Cl.
CPC ...... *G06F 11/3495* (2013.01); *G06F 9/45558* (2013.01); *G06F 11/301* (2013.01); *G06F 11/3006* (2013.01); *G06F 11/3433* (2013.01); *G06F 11/3452* (2013.01); *G06F 2009/45591* (2013.01); *G06F 2201/815* (2013.01)

(58) Field of Classification Search
None
See application file for complete search history.

*Primary Examiner* — Gregory A Kessler
(74) *Attorney, Agent, or Firm* — Knobbe Martens Olson & Bear, LLP

(57) ABSTRACT

Systems and methods are described for the collection and transmission of virtual machine resource operations information. Individual agents on virtual machine resources collect and store operations information in accordance with a current operations information collection configuration. The individual agents will initiate a transmission of the collected operations information, including an identification of the current operations information collection configuration being implemented by the respective agent. Responsive to the receipt of the transmission of the collected operations information, the monitoring processing service makes a determination of whether the current operations information collection configuration is appropriate or should otherwise be maintained or changed. The monitoring processing service will include the identification of the new operations information collection configuration in the message responsive to the transmission of the collected operations information from the agent.

20 Claims, 9 Drawing Sheets

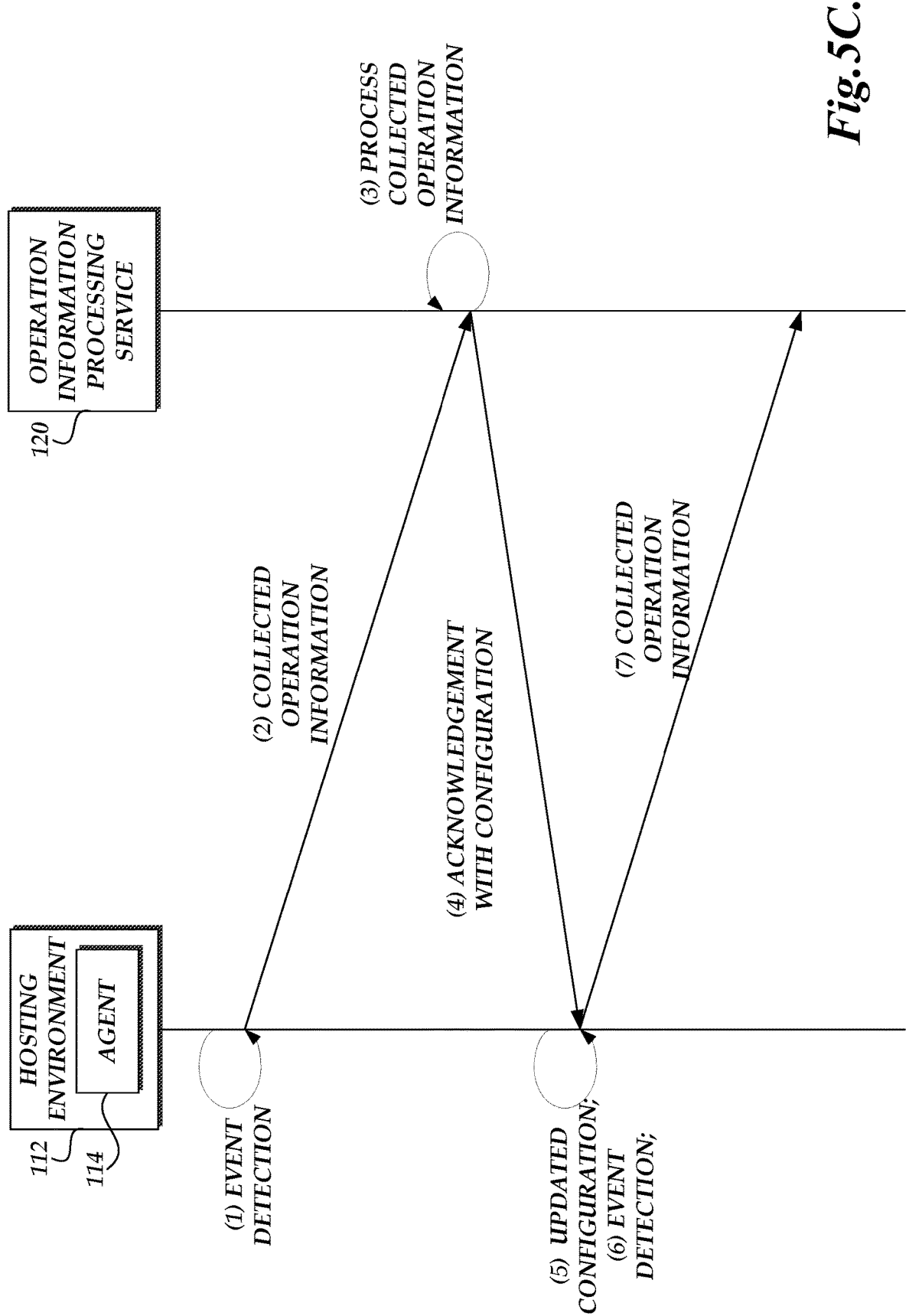

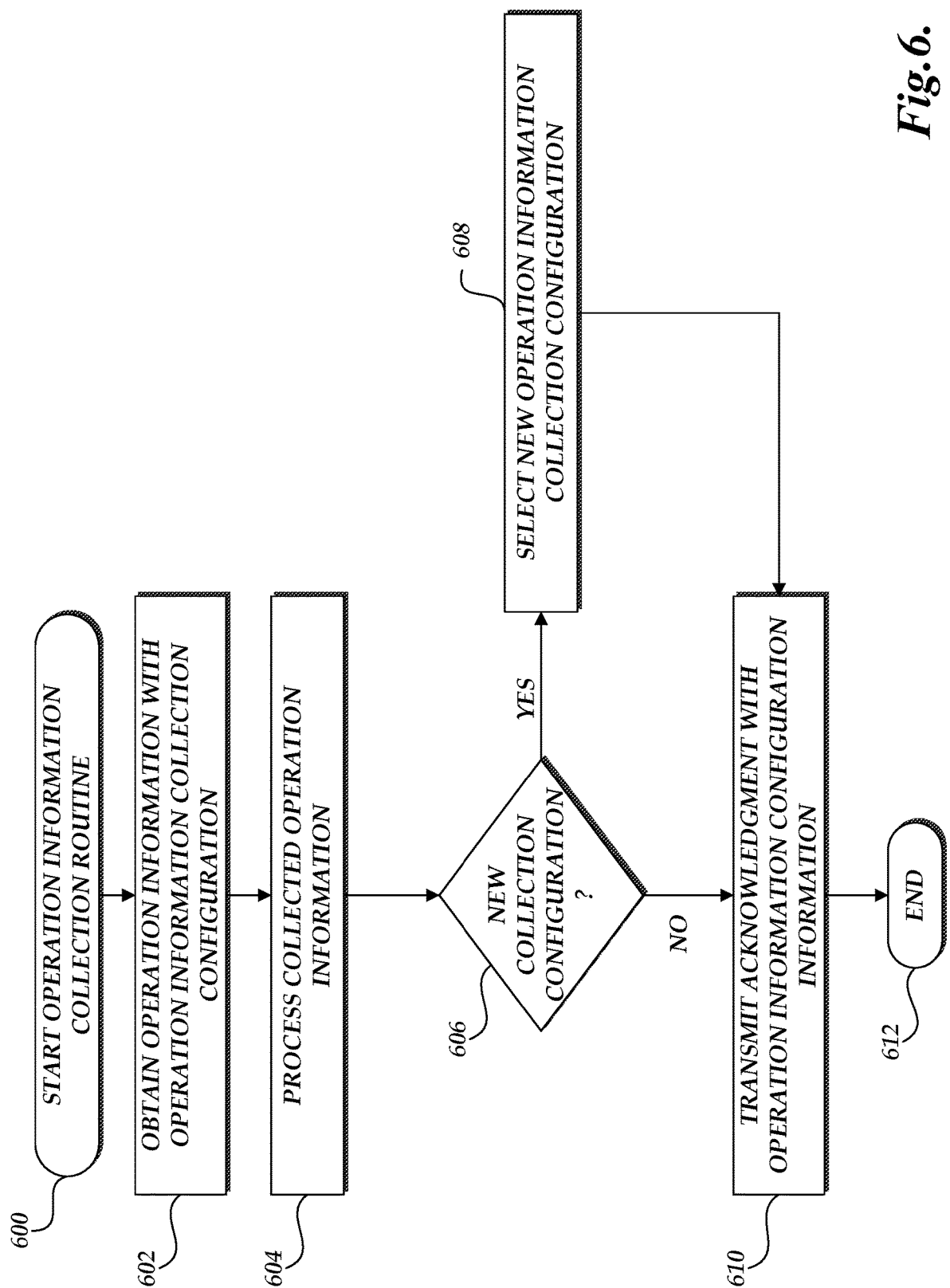

DYNAMICALLY CONFIGURABLE OPERATION INFORMATION COLLECTION

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some environments, the virtual machine resources can be configured for implementation of specific functionality or otherwise configured to include selected software applications. In accordance with the implementation of the specific functionality or selected functionality, the virtual machine resources can collect operations information for processing or analysis by the service provider or customer.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

FIGS. 5A-5C are block diagrams of the illustrative environment of FIG. 1 depicting illustrative interactions for collecting and exchanging collected operations information in accordance with aspects of the present application;

FIG. 6 is a flow diagram illustrative of an operations information collection configuration routine implemented by a monitoring processing service component in accordance with an illustrative embodiment.

DETAILED DESCRIPTION

Figure 1:
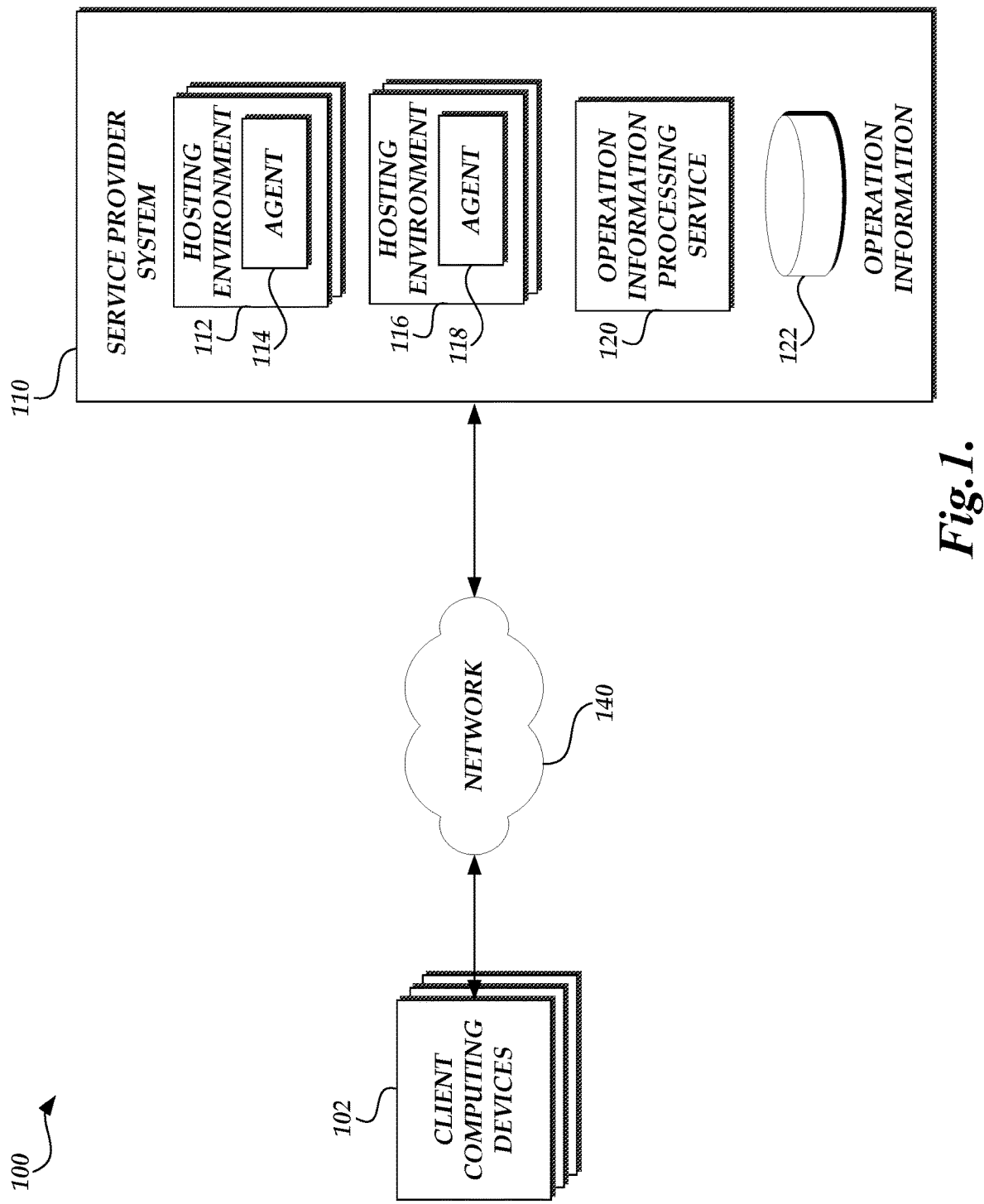
FIG. 1 is a block diagram depicting an illustrative environment including client computing devices, virtual machine resources and a service provider system for providing virtual machine resources and managing virtual machine resource operations information and a monitoring processing service.

Generally described, the present application corresponds to the management of data transmitted between computing devices in a communication network. More specifically, aspects of the present application correspond to dynamic management for the collection and transmission of virtual machine resource operations information. Illustratively, one or more virtual machine resources are hosted on physical computing devices provided by a service provider and configured in accordance with individual customer or client configurations. In addition to the software applications, operating environments and other configurations specified by the customer, the virtual machine resources include one or more software components, generally referred to as agents, that collect various information related to the instantiation and execution of the virtual machine resources. Such information, generally referred to as operations information, performance information or metric information, can include, but is not limited to file system information, networking interface information, and computing device resource information. Accordingly, reference to operations information in the present application should not be construed as limiting as to any particular type of information or excluding any type of information that may be generated by or measured in accordance with the operation of virtual machine resources.

In accordance with some embodiments, the agents on the virtual machine resources are configured to process collected operations information and then transmit the processed (or unprocessed) operations information to a collected monitoring processing service provided by the service provider. The monitoring processing service can review individual collected or group operations information to identify potential error conditions in the operation of the virtual machine resources, conduct causal analysis of reported errors, validate service level agreements regarding performance, generate optimization information, and the like. The collected monitoring processing service will typically act on the processed information by generating corrective actions, notifications, etc. Additionally, the collected monitoring processing service will typically utilize a storage service or other network storage for maintaining the reported/transmitted operations information.

In some embodiments, individual agents are configured to transmit all, or a substantial amount of, collected operations information. This approach can result in each individual virtual machine resource agent transmitting a large amount of data to the collected monitoring processing service. The financial costs associated with the collected monitoring processing service processing and storing the collected operations information, especially for customers associated with multiple virtual machine resources can be cost prohibitive.

It may be possible to cause a change in the configuration of the agents in terms of the types or amounts of data collected or in the amount of collected data that is transmitted to the monitoring processing service. In one example, the collected monitoring processing service can implement a pull model in which the individual agents periodically transmit requests to the collected monitoring processing service to determine if there is a change in an operations information collection configuration. In another example, the monitoring processing service can implement a push model in which the collected monitoring processing service establishes communications with individual agents to cause changes in the operations information configuration of the agents. Both such models, however, can be inefficient, especially for larger scale implementation. For example, the pull model can be deficient as it increase resources consumed in managing how and when agents poll the monitoring processing service and additional communication network consumed in transmitting requests, especially when no change required. With regard to the push model, this approach can also be deficient in that the collected monitoring processing service and individual agents require additional communication resources to allow the monitoring processing service to be able to initiate communications with the agents.

In accordance with aspects of the present application, individual agents on virtual machine resources collect and locally store collected operations information in accordance with a current operations information collection configuration. For example, during operation in which no errors have been detected or reported, the agents may be configured according a default operations information collection configuration that limits the amount of data transmitted to the monitoring processing service or the frequency in which the collected operations information is transmitted. The agents will illustratively store all the collected operations information in a locally accessible data store and in way such that more collected operations information is stored by the individual agent than is transmitted to the monitoring processing service.

At some point during the operation of individual virtual machine resource operation, corresponding agents will initiate a transmission of the collected operations information (according to the current operations information configuration). The agents will include a set of collected operations information and an identification of the current operations information collection configuration being implemented by the respective agent.

Responsive to the receipt of the transmission of the collected operations information, the collected monitoring processing service can process the collected operations information in the manner described above (e.g., error checking, etc.). Additionally, the collected monitoring processing service makes a determination of whether the current operations information collection configuration is appropriate or should otherwise be maintained or changed. The determination can be illustratively based on the collected operations information included in the transmission, such as a determination or reporting of an error condition, determination or assessment of current workloads or usage, time-based criteria, and the like. Additionally, the determination can be based on additional inputs, such as customer requests, inputs from other virtual machine resources, and the like.

If the collected monitoring processing service determines that an operations information collection configuration for the agent needs to be changed or modified, the collected monitoring processing service can select a new or updated operations information collection configuration. Additionally, the collected monitoring processing service will include the identification of the new operations information collection configuration in the message responsive to the transmission of the collected operations information from the agent, such as including an operations information collection configuration identifier in an acknowledgement message. In some embodiments, the collected monitoring processing service can also include a confirmation code or repeat the current operations information collection configuration if there is no change. Additionally, the collected monitoring processing service can also include a request for the transmission by the agent of at least a portion of the previously collected operations information.

Upon receipt of the responsive message, the individual agents can parse the communication for any operations information collection configuration information and process included information to cause changes to the operations information that is being collected, cause a subsequent transmission of additional operations information that had been previously not transmitted, changes in the frequency of collected operations information transmissions, and the like. By leveraging the existing communications between the agents and the collected monitoring processing service, aspects of the present application facilitate the dynamic modification of operations information collection configurations without the above identified deficiencies of the traditional push and pull model, including but not limited to, reducing the strain on communication resources to transmit requests or data, facilitating the optimization of how much collected operations information is sent to the collected monitoring processing service, and not requiring additional or ad hoc communications between agents and the collected monitoring processing service.

Although aspects of some embodiments described in the disclosure will focus, for the purpose of illustration, on specific examples of collected operations information or specific processing techniques for collected operations information by a monitoring processing service, one skilled in the relevant art will appreciate that the examples are illustrative only and are not necessarily intended to be limiting. As will be appreciated by one of skill in the art in light of the present disclosure, the embodiments disclosed herein improves the ability of computing systems, and particularly computing systems with limited localized user interfaces, to be coordinated and managed by an external device. The foregoing aspects and many of the attendant advantages of this disclosure will become more readily appreciated as the same become better understood by reference to the following description, when taken in conjunction with the accompanying drawings.

FIG. 1 is a block diagram depicting an illustrative logical network 100 including multiple client computing devices 102, and a service provider network 110 in communication via a network 140. While the client computing devices 102 are shown as a group within FIG. 1, the client computing devices 102 may be geographically distant, and independently owned or operated. For example, the client computing devices 102 could represent a multitude of users in various global, continental, or regional locations accessing the service provider system 110. Accordingly, the groupings of client computing devices 102 within FIG. 1 is intended to represent a logical, rather than physical, grouping. Similarly, while one set of illustrative components is shown to represent the service provider system 110, multiple instances of each component may be present within the service provider system 110, and such components may be located within geographically diverse areas (e.g., globally, continentally, or regionally), in order to provide a wide geographical presence for the service provider system 110.

Network 140 may be any wired network, wireless network, or combination thereof. In addition, the network 140 may be a personal area network, local area network, wide area network, cable network, satellite network, cellular telephone network, or combination thereof. In the example environment of FIG. 1, network 140 is a global area network (GAN), such as the Internet. Protocols and components for communicating via the other aforementioned types of communication networks are well known to those skilled in the art of computer communications and thus, need not be described in more detail herein. While each of the client computing devices 102 and the service provider system 110 is depicted as having a single connection to the network 140, individual components of the client computing devices 102 and service provider system 110 may be connected to the network 140 at disparate points.

Client computing devices 102 may include any number of different computing devices capable of communicating with the service provider system 110. For example, individual accessing computing devices may correspond to a laptop or tablet computer, personal computer, wearable computer, server, personal digital assistant (PDA), hybrid PDA/mobile phone, mobile phone, electronic book reader, set top box, camera, digital media player, and the like. Each client computing device 102 may include one or more data stores (not shown in FIG. 1) including various applications or computer-executable instructions, such as web browsers, used to implement the embodiments disclosed herein. For purposes of illustration, the client computing device 102 can be utilized to configure the collection of operations information.

In accordance with embodiments, the service provider system 110 includes two or more hosting environments, illustrated in FIG. 1 as hosting environment 112 and hosting environment 116. As described in further detail below, the hosting environment 112 and hosting environment 116 can each host virtualized applications 114, 118 for interaction with a corresponding application instantiated on the client computing device 102. For purposes of illustrative example, the two hosting environments, hosting environment 112 and hosting environment 116, correspond to the same customer of the service provider. As will be described in detail below, each hosting environment collects information regarding the general operation or functionality of the hosting environment and transmits at least a subset of the collected operations information based on an operations information collection configuration.

With continued reference to FIG. 1, the service provider system 110 also includes a monitoring processing service component 120. The monitoring processing service component 120 is operable to receive and process collected operations information from a plurality of hosting environments, such as hosting environment 112 and 116. Additionally, as will be described in detail below, the monitoring processing service component 120 can further monitoring and update individual operation information collection configurations for the agents on the hosting environments. The service provider system 110 can further include one or more data stores 122 for managing collected operations information.

It will be appreciated by those skilled in the art that the service provider system 110 may have fewer or greater components than are illustrated in FIG. 1. Thus, the depiction of the service provider system 110 in FIG. 1 should be taken as illustrative. For example, in some embodiments, components of the service provider system 110, such as the hosting environment 112 and hosting environment 116, may be executed by one more virtual machines implemented in a hosted computing environment. Additionally, the hosting manager component 120 and hosting and application data store 122 may correspond to multiple physical or virtual computing resources that may logically represented as a single component, but may be implement in a distributed manner.

Figure 2:
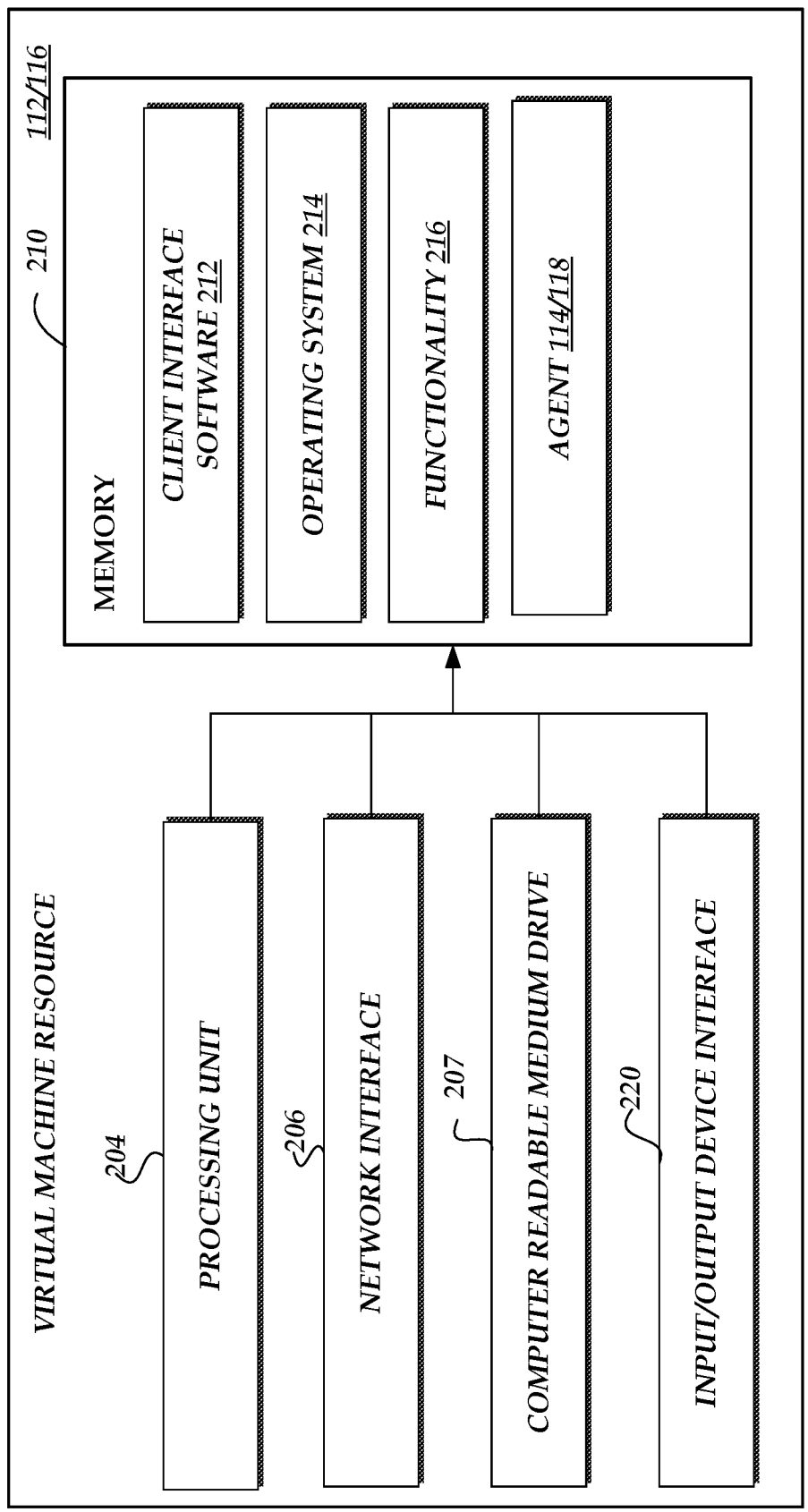
FIG. 2 depicts a general architecture of a computing device providing a monitoring processing service for processing operations information and providing operations information collection configurations to virtual machine resources.

FIG. 2 depicts one embodiment of an architecture of an illustrative computing device for implementing the virtual machine resources component described herein. As previously described, a service provider can provide physical computing devices that host virtual machine resources configured on behalf of individual customers. Accordingly, the general architecture of the virtual machine resources component depicted in FIG. 2 includes an arrangement of virtualized hardware and software components that may be used to implement specific functionality.

As illustrated, the virtual machine resources component includes a processing unit 204, a network interface 206, a computer readable medium drive 207, an input/output device interface 220, an optional display 202, and an input device 224, all of which may communicate with one another by way of a communication bus.

The network interface 206 may provide connectivity to one or more networks or computing systems, such as the network 120 of FIG. 1. The processing unit 204 may thus receive information and instructions from other computing systems or services via a network. The processing unit 204 may also communicate to and from memory 210 and further provide output information via the input/output device interface 220. The input/output device interface 220 may also accept input from various input devices.

The memory 210 may include computer program instructions that the processing unit 204 executes in order to implement one or more embodiments. The memory 210 generally includes RAM, ROM, or other persistent or non-transitory memory. The memory 210 may store an operating system 214 that provides computer program instructions for use by the processing unit 204 in the general administration and operation of the virtual machine resources component. The memory 210 may further include computer program instructions and other information for implementing aspects of the present disclosure. For example, in one embodiment, the memory 210 includes functional component software 212 which generally represents one or more software components that are implemented to provide the configured functionality of the virtual machine resources component. Examples include, but are not limited, database components or software application, storage components or software applications, data processing components or software applications, social media network or web applications or components, and the like. Additionally, the memory 210 includes a collection agent 216 for implementing an operations information collection configuration including the collection of various operations information, local storage of collected operations information, local processing of collected operations information and transmission of collected operations information to a collected monitoring processing service.

Figure 3:
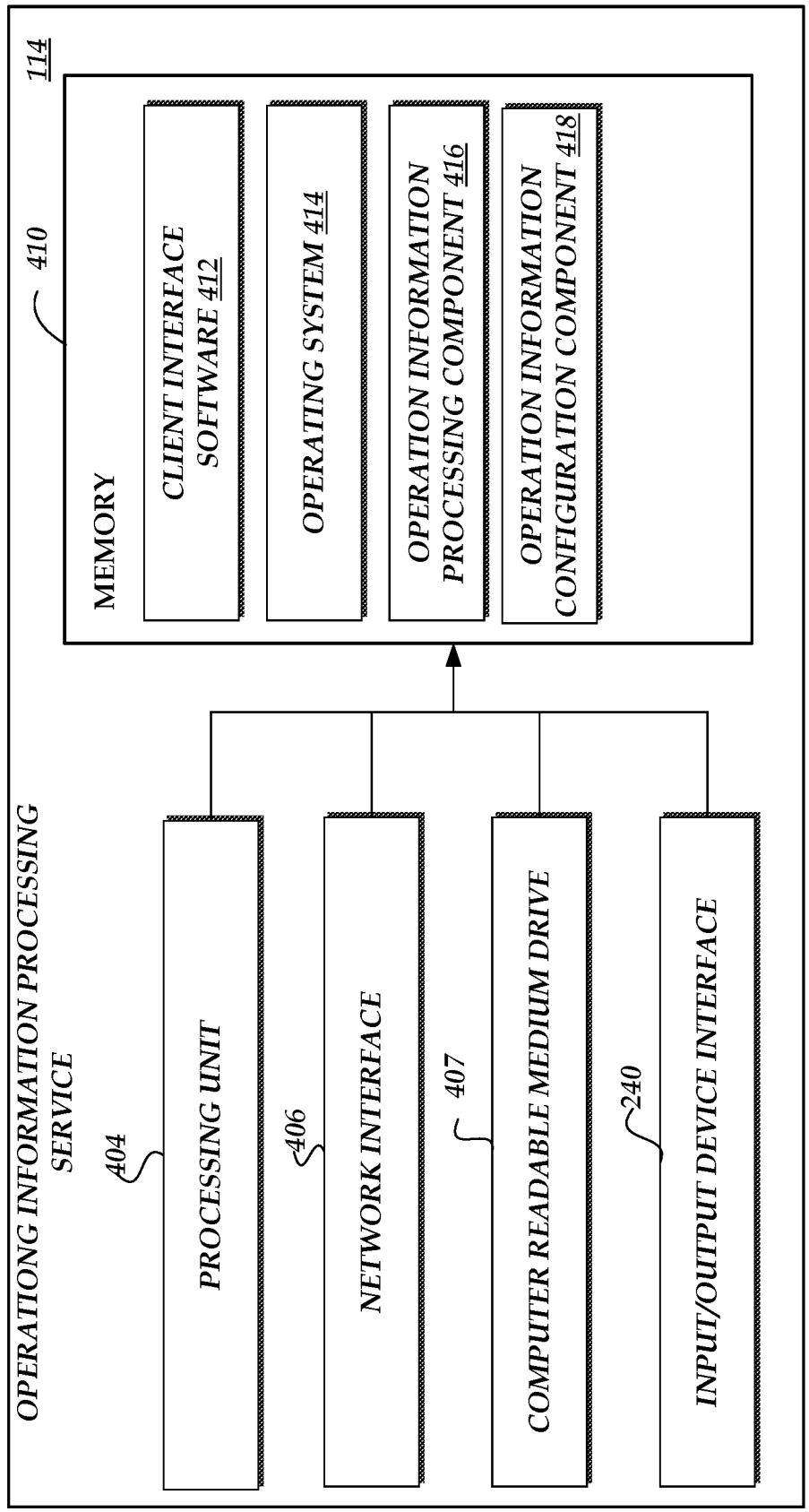
FIG. 3 depicts a general architecture of a computing device collecting and providing operations information.

FIG. 3 depicts one embodiment of an architecture of an illustrative computing device for implementing the monitoring processing service component 120 described herein. As illustrated, the monitoring processing service component 120 includes a processing unit 304, a network interface 306, a computer readable medium drive 307, an input/output device interface 320, an optional display 302, and an input device 324, all of which may communicate with one another by way of a communication bus.

The network interface 306 may provide connectivity to one or more networks or computing systems, such as the network 140 of FIG. 1. The processing unit 304 may thus receive information and instructions from other computing systems or services via a network. The processing unit 304 may also communicate to and from memory 310 and further provide output information via the input/output device interface 320. The input/output device interface 320 may also accept input from various input devices.

The memory 310 may include computer program instructions that the processing unit 304 executes in order to implement one or more embodiments. The memory 310 generally includes RAM, ROM, or other persistent or non-transitory memory. The memory 310 may store an operating system 314 that provides computer program instructions for use by the processing unit 304 in the general administration and operation of the virtual machine resources component. The memory 310 may further include computer program instructions and other information for implementing aspects of the present disclosure. For example, in one embodiment, the memory 310 includes functional component software 312 which generally represents one or more software components that are implemented to provide the configured functionality of the virtual machine resources component. Examples include, but are not limited, database components or software application, storage components or software applications, data processing components or software applications, social media network or web applications or components, and the like. Additionally, the memory 310 includes an operations information collection agent 316 for implementing an operations information collection configuration including the collection of various operating information/metrics, local storage of collected information/metrics, local processing of collected information/metrics and transmission of collected operations information to a monitoring processing service. Although the monitoring processing service component is illustrated as a single computing device, one skilled in the relevant art will appreciate that the functionality associated with the collected monitoring processing service component may be implemented in a distributed manner.

Figure 4:
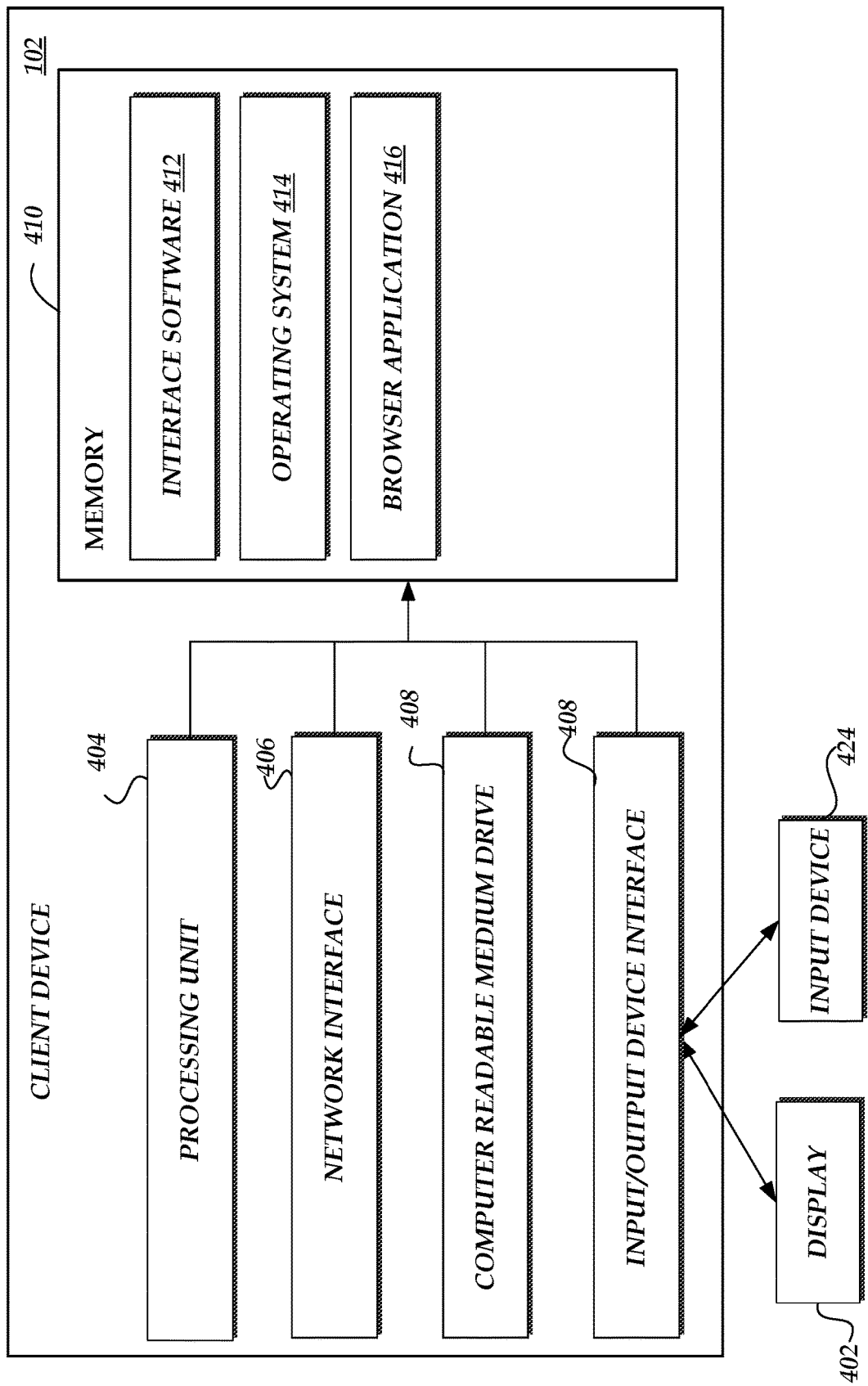
FIG. 4 depicts a general architecture of client device that may be utilized to generate and submit operations information collection configuration information related to virtual machine resources.

FIG. 4 depicts one embodiment of an architecture of an illustrative client device 102 in accordance with the present application. The general architecture of the client device 102 depicted in FIG. 4 includes an arrangement of computer hardware and software components that may be used to implement aspects of the present disclosure. As illustrated, the client device 102 includes a processing unit 404, a network interface 406, a computer readable medium drive 407, an input/output device interface 420, an optional display 402, and an input device 424, all of which may communicate with one another by way of a communication bus.

The network interface 406 may provide connectivity to one or more networks or computing systems, such as the network 104 of FIG. 1. The processing unit 404 may thus receive information and instructions from other computing systems or services via a network. The processing unit 404 may also communicate to and from memory 410 and further provide output information for an optional display 402 via the input/output device interface 420. The input/output device interface 420 may also accept input from the optional input device 424, such as a keyboard, mouse, digital pen, etc. In some embodiments, the client device 102 may include more (or fewer) components than those shown in FIG. 4. For example, some embodiments of the coordinated device 112 may omit the display 402 and input device 424, while providing input/output capabilities through one or more alternative communication channel (e.g., via the network interface 406). Additionally, the client device 102 may omit the input and output interface 420 altogether as well.

The memory 410 may include computer program instructions that the processing unit 204 executes in order to implement one or more embodiments. The memory 410 generally includes RAM, ROM, or other persistent or non-transitory memory. The memory 410 may store an operating system 414 that provides computer program instructions for use by the processing unit 404 in the general administration and operation of the client device 102. The memory 410 may further include computer program instructions and other information for implementing aspects of the present disclosure. For example, in one embodiment, the memory 410 includes a browser application 416 or other connectivity application for accessing configuration interfaces or transmission configuration information to a monitoring processing service.

Figure 5A:
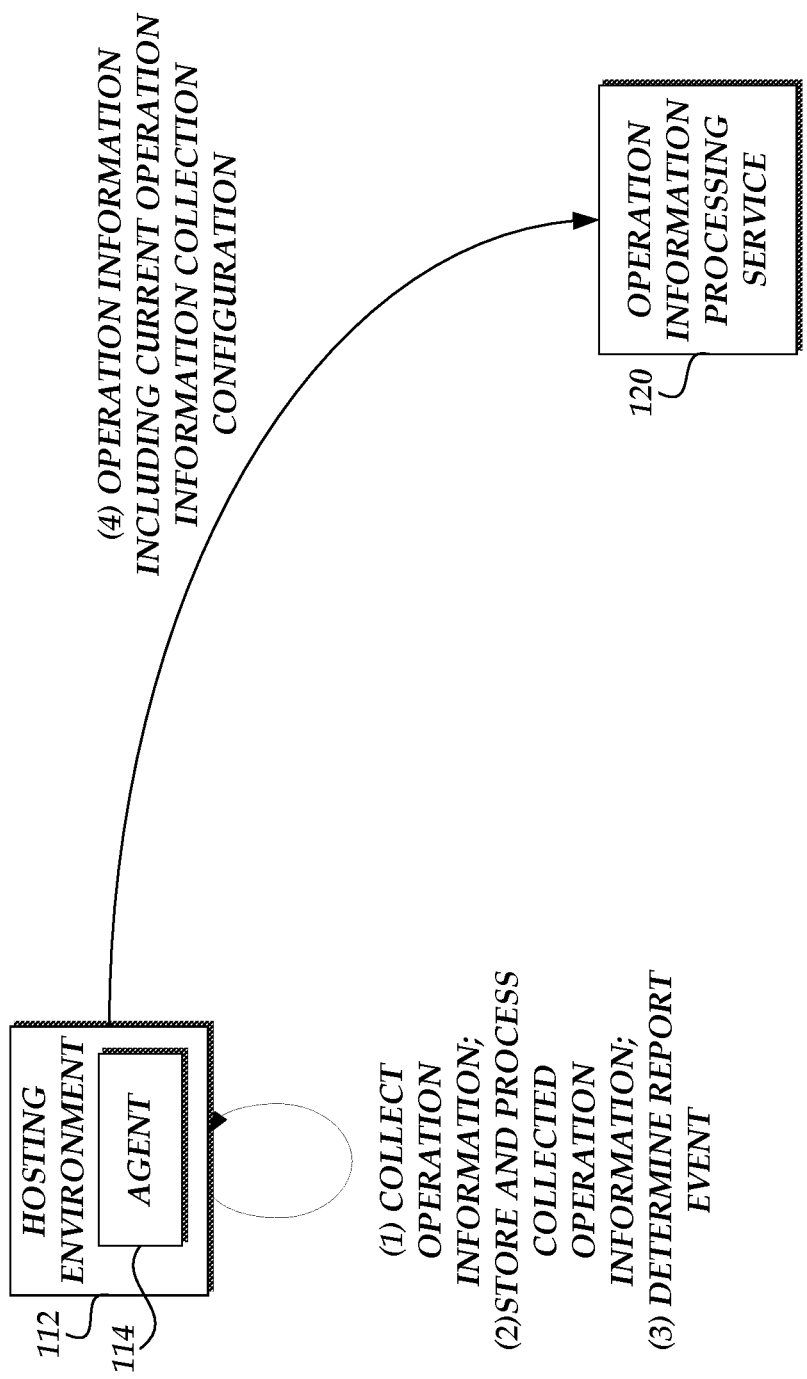
Figure 5B:
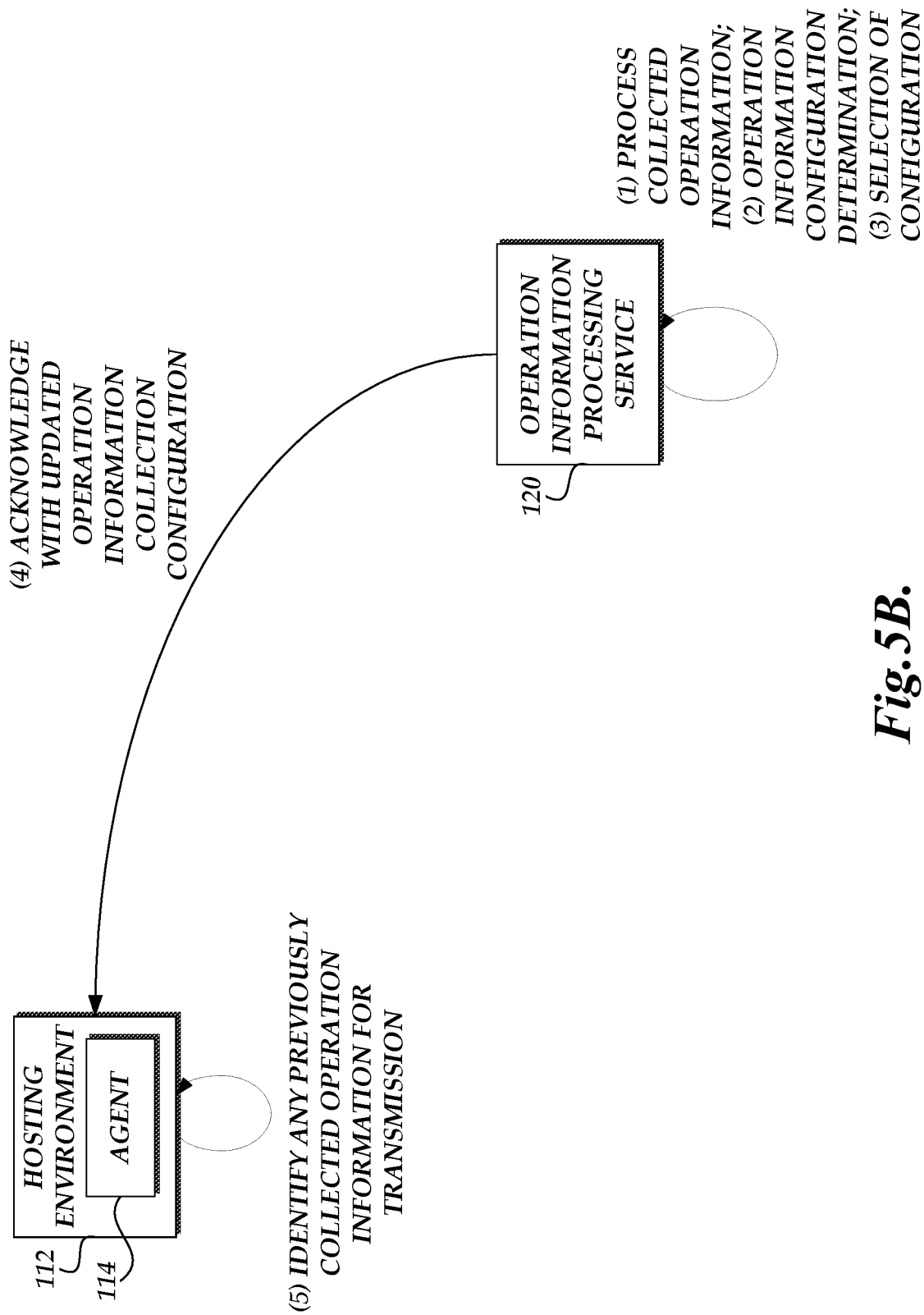

Turning now to FIGS. 5A-5C, illustrative interactions between the components of the service provider system 110 to manage the collection and processing of operations information will be described. More specifically, FIGS. 5A-5C will be described with regard to interactions between virtual machine resource devices 112, and a monitoring processing service component 120. As previously indicated, the monitoring processing service component 120 can be implemented by a variety of devices including the coordinator 114 or other network equipment. Additionally, the virtual machine resource 112 can correspond to any number of devices configured on behalf of an identified customer or set of customers. The process illustrated in FIGS. 5A-5C begins with consideration that a virtual machine resource 112 has been instantiated and configured on behalf of a customer.

With reference to FIG. 5A, at (1), the virtual machine resource 112 is executing one or more software applications. The agent 114 on the virtual machine resource 112 collects or otherwise facilitates the collection of various operations information related to operation of the virtual machine resource. As previously described, the operations information can include, but is not necessarily limited to, file system information, network interface information and resource consumption information. For example, the agent 114 can collect information related to CPU utilization during a defined time window or a specified time intervals. In another example, the agent 114 can collect operations information related to measure packet loss rates, network packet retransmission rates, etc. In still other example, the agent 114 can collect operations information related to times and success rates for various virtual machine resource I/O operations, such as data reads or data write operations. In still a further example, the agent 114 can collect any error conditions or error logs generated during the operation of the virtual machine resource 112. Such information can also be provided by additional processes or software applications to review the collected operations information and make determinations regarding potential errors or conduct additional processing/analysis on the collected operations information.

At (2), the agent 114 can store and process the collected operations information in accordance with a current operations information collection configuration. Illustratively, an operations information collection configuration can specify the types of operations information that should be collected, the amount of operations information that should be stored locally, additional data analytics that should be carried out locally, and criteria for determining when collected operations information should be transmitted to the collected monitoring processing service 120. At (3), the agent 114 makes a determination that a reporting event has occurred that will cause the agent 114/virtual machine resource 112. For example, if an operations information collection configuration specifies a time interval for transmitting collected operations information, the determination of transmission can be a simple identification of the expiration of the specified time period. In another example, if an operations information collection configuration specifies a specific value of a collected operation information (e.g., CPU utilization) or a determined trend (e.g., an extrapolated set of operations information values), the agent 114 utilizes the processing of the operations information in making the determination that a reporting event has occurred.

At (4), the agent 114 transmits operations information to the monitoring processing service component 120. Illustratively, the agent 114 can transmit all of the collected operations information or a subset of the collected operations information based on the current operations information collection configuration being implemented by the agent. Additionally, in accordance with the present application, the transmitted operations information includes information identifying the current operations information collection configuration. In one example, the agent 114 may be preconfigured with a set of predefined operations information collection configuration. In this example, the information can include an identifier corresponding to the specific operations information collection configuration. In another example, the agent 114 can implement customized collection of operations information in which specific operation information and reporting intervals are selected. It this example, the information can include the identification of the template of operations information that are being collected, processed and reported. Other examples or types of identification can also be included within the scope of the present application.

With reference to FIG. 5B, the monitoring processing service component 120 obtains the transmission and at (1), processes the transmitted operations information. Illustratively, the monitoring processing service component 120 can be configured to process the collected in a number of ways, including but not limited to, determining error conditions, initiating notifications, causing the initiation of responsive action (e.g., error correction), storing the collected data, and the like. At (2), the monitoring processing service component 120 parses the transmitted operations information to obtain the information identifying the current operations information collection configuration included in the operations information transmission.

At (3), the monitoring processing service component 120 makes a determination regarding the identified current operations information collection configuration. In one example, the determination can include a decision whether the current configuration operations information should be renewed. In another example, the determination can include a decision whether current operations information collection configuration should be changed or modified. Illustratively, the monitoring processing service component 120 can utilize the transmitted operations information and the current operations information collection configuration in making the determination. For example, if the collected operations information includes an error condition or if the processing of the collected operations information is indicative of an error, exceeded value, etc., the monitoring processing service can utilize the collected operations information to select an updated or new operations information collection configuration. In another example, the monitoring processing service component 120 can utilize additional information in making the determination. In this example, the monitoring processing service component 120 can receive a configuration change request from a client computing device 102. Alternatively, the monitoring processing service component 120 can utilize information from other virtual machine resources that have been processed and cause a change in configuration changes. The monitoring processing service component 120 can utilize processing rules or selection matrices that facilitate both a determination of whether the current operations information collection configuration should be changed and, if appropriate, a selection of a new or updated operations information collection configuration.

At (4), the monitoring processing service component 120 transmits information corresponding to the updated operations information collection configuration (e.g., remaining the same or changing) to the virtual machine resource 112. As previously described, the agent 114 may be preconfigured with a set of predefined operations information collection configurations. In this example, the information can include an identifier corresponding to a specific operations information collection configuration. Accordingly, the agent 114 would look up the identified operations information collection configuration and implement the configuration, such as by identifying additional operations to collect, identifying additional processing to be conducted on the collection operations information, utilizing include interfaces to access additional software applications, and the like. In another example, the agent 114 can implement customized collection operations information collection configuration in which specific operations information and collection intervals are selected. In this example, the information can include the identification of an updated template of information/metrics that are to be collected. In this example, the agent 114 can parse or extract the identified operations information in the template and modify the software configuration for collecting the operations information. Additionally, the agent 114 can parse or extract any additional processing instructions included in the temple. In still other example, the agent 114 can utilize an interface, such as an API, to request additional executable code or processing instructions that cause respective changes in the operation of the agent 114 or associated processes to cause a change in the operations information collection configuration. Other examples or types of identification can also be included within the scope of the present application.

By way of illustrative example, the updated operations information collection configuration can increase the time frequency in which the agent 114 can transmit collected operations information to the processing monitoring service 120. In another example, the updated operations information collection configuration can specify at least one additional piece of information that will be either collected or reported (if previously collected) at the next reporting interval. In a further example, the updated operations information collection configuration can specify additional processing (e.g., statistical analysis, data comparisons, etc.) that can be conducted by the agent 114. Additionally, the operations information collection configuration can specify previously collected operations information that should be processed or transmitted, either independently or with the next scheduled transmission interval.

As (5), in embodiments in which the monitoring processing service component 120 has requested for the agent 114 to transmit previously collected information, the agent can identify any locally stored collected operations information for transmission as part of the operations information collection configuration. Still further, in some embodiments, the monitoring processing service component 120 may not change or modify the operations information collection configuration, but may transmit the request for additional collected operations information as part of the responsive message in which the current operations information collection configuration is renewed or not indicated as changing.

Turning to FIG. 5C, the interaction between a monitoring processing service component 120 and a virtual machine resource 116 will be described. At (1), the virtual machine resource 116 collects operations information and at (2) transmits the collected operations information. As previously indicated, the transmission of the collected operations information would include an identification of the current operations information collection configuration. At (3), the monitoring processing service component 120 processes the collected operations information, the current operations information collection configuration, and then determines whether the current operations information collection configuration should be updated or modified. At (4), the monitoring processing service component 120 transmits information corresponding to the current operations information collection configuration (e.g., remaining the same or changing) to the virtual machine resource. As previously described, the transmission of the acknowledgment with the configuration can also include requests or identification of additional previously stored collected operations information.

At (5), the virtual machine resource processes the acknowledgement message and obtains the updated operations information collection configuration information. Illustratively, this can include the identification of any additional information that may need to be transmitted. As previously described, the agent 114 may be preconfigured with a set of predefined operations information collection configurations. In this example, the information can include an identifier corresponding to a specific operations information collection configuration. Accordingly, the agent 114 would look up the identified operations information collection configuration and implement the configuration, such as by identifying additional operations to collect, identifying additional processing to be conducted on the collection operations information, utilizing include interfaces to access additional software applications, and the like. In another example, the agent 114 can implement customized collection operations information collection configuration in which specific operations information and collection intervals are selected. In this example, the information can include the identification of an updated template of information/metrics that are to be collected. In this example, the agent 114 can parse or extract the identified operations information in the template and modify the software configuration for collecting the operations information. Additionally, the agent 114 can parse or extract any additional processing instructions included in the temple. In still other example, the agent 114 can utilize an interface, such as an API, to request additional executable code or processing instructions that cause respective changes in the operation of the agent 114 or associated processes to cause a change in the operations information collection configuration.

At (6), the process repeats when virtual machine resource 116 collects operations information according to the updated or new operations information collection configuration and at (7) transmits the collected operations information.

FIG. 6 is a flow diagram illustrative of an operations information collection configuration routine implemented by a monitoring processing service component 120 in accordance with an illustrative embodiment. Routine 600 illustrates the utilization of embedded operations information collection configuration information in both the reporting of operations information and responsive communication. At block 602, the monitoring processing service component 120 obtains the transmission of collected operations information from a virtual machine resource (or set of virtual machine resources). At block 604, monitoring processing service component 120 processes the transmitted operations information. Illustratively, the monitoring processing service component 120 can be configured to process the collected in a number of ways, including but not limited to, determining error conditions, initiating notifications, causing the initiation of responsive action (e.g., error correction), storing the collected data, and the like. Included in the processing, the monitoring processing service component 120 parses the transmitted operations information to obtain the information identifying the current operations information collection configuration included in the operations information.

At decision block 606, the monitoring processing service component 120 makes a determination regarding the identified current operations information collection configuration. In one example, the determination can include a decision whether the current operations information collection configuration should be renewed. In one aspect, the determination can include a decision whether current operations information collection configuration should be changed or modified. Illustratively, the monitoring processing service component 120 can utilize the transmitted operations information and the current operations information collection configuration in making the determination. For example, if the collected operations information includes an error condition or if the processing of the collected operations information is indicative of an error, exceeded value, etc., the monitoring processing service component 120 can utilize the values of the operations information to lookup a different or modified operations information collection configuration, such a via a lookup table, decision trees, business rules or matrices.

In another aspect, the monitoring processing service component 120 can utilize additional information in making the determination. In one example, the monitoring processing service component 120 can receive a configuration change request from a client computing device 102. In this example, the client computing device 102 can utilize an interface to specify a change in the operations information collection configuration, the virtual machine resources that will implement the change and a timing associated with the change. In another example, the monitoring processing service component 120 can utilize information from other virtual machine resources that have been processed and cause a change in configuration changes. For example, the monitoring processing service component 120 can utilize reporting information from a set of virtual machine resources having common organizational criteria, such as being associated with an individual customer, geographic location, software configuration, designated function, and the like. Based on reviewing cumulative collected operations information from the set of virtual machine resources, the monitoring processing service component 120 can modify the amount or type of operations information provided by the individual virtual machine resources associated with the organizational criteria. The monitoring processing service component 120 can utilize processing rules or selection matrices that facilitate a determination of whether the current operations information collection configuration should be changed. In yet another example, the monitoring processing service component 120 can evaluate other criteria, such as time of day, network conditions indicative of high activity, or random selection criteria to cause a change in the operations information collection configuration. The monitoring processing service component 120 may wish to periodically audit virtual machine resource operation and increase monitoring of randomly selected virtual machine resources. Or, the monitoring processing service component 120 can implement greater monitoring during times of day or times of year in which virtual machine resource utilization is experiencing greater loads or under increased pressure to avoid failures.

If the monitoring processing service component 120 determines that the current operations information collection configuration should be changed, at block 608, the monitoring processing service component 120 selects a new or updated operations information collection configuration. Additionally, the monitoring processing service component 120 can determine whether additional collected operations information (either different in type or volume) should attempt to be collected from the agent 114. Illustratively, the monitoring processing service component 120 can utilize the same processing rules or selection matrices utilized to determine whether the previously reported operations information collection configuration was valid to select an updated current operations information collection configuration. In other embodiments, if an external communication or configuration has specified a change in the current operations information collection configuration, the monitoring processing service component 120 can utilize a specified updated operations information collection configuration. Even further, the monitoring processing service component 120 can validate a specified operations information collection configuration, such as by utilizing the received collected operations information to validate that the configuration is appropriate (e.g., was a configuration specified that may not be valid in view of the collected operations information).

At block 610, the monitoring processing service component 120 transmits information corresponding to a new or renewed current operations information collection configuration (e.g., remaining the same or changing) to the virtual machine resource. As previously described, agents may be preconfigured with a set of predefined operations information collection configuration. In this example, the information can include an identifier corresponding to the specific operations information collection configuration. In another example, agents can implement customized operations information collection configurations in which specific operations information and reporting intervals are selected. It this example, the information can include the identification of an updated template of collected operations information that are to be collected. Other examples or types of identification can also be included within the scope of the present application. Additionally, as described previously, the responsive communication can also include an identifier or other type of request for the agent to identify and transmit previously collected operations information that had been stored locally and not previously transmitted. At block 612, the routine 600 terminates.

Figure 7:
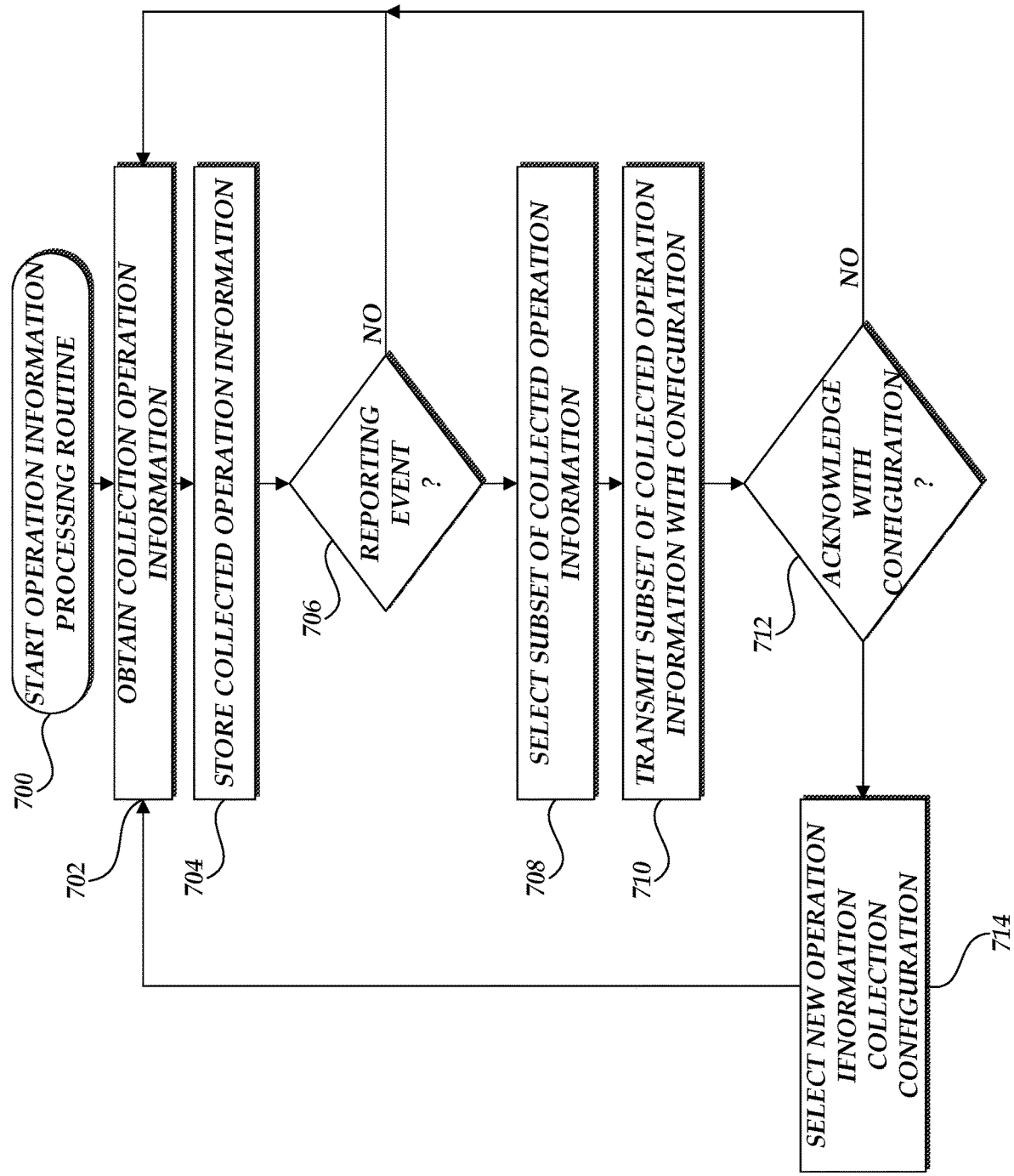
FIG. 7 is a flow diagram illustrative of an operation information collection routine implemented by a virtual machine resource in accordance with an illustrative embodiment.

FIG. 7 is a flow diagram illustrative of an operations information collection routine 700 implemented by a virtual machine resource. At block 702, the virtual machine resource collects or otherwise facilitates the collection of various operations information related to operation of the virtual machine resource. As previously described, the operations information can include, but is not necessarily limited to, file system information, network interface information and resource consumption information related to the execution of virtual machine resource. For example, agents can collect information related to CPU utilization during a defined time window or a specified time intervals. In another example, agents can collect operations information related to measure packet loss rates, network packet retransmission rates, etc. In still other example, agents can collect information related to times and success rates for various virtual machine resource I/O operations, such as data reads or data write operations. In still a further example, agents can collect any error conditions or error logs generated during the operation of the virtual machine resource.

At block 704, the virtual machine resource can store and process the collected operations information in accordance with a current operations information collection configuration. Illustratively, the operations information collection configuration can specify the types of operations information that should be collected, the amount of operations information that should be stored locally, additional data analytics that should be carried out locally, and criteria for determining when collected operations information should be transmitted to the monitoring processing service 120. At decision block 706, the agent makes a determination that a reporting evening has occurred that will cause the agent/virtual machine resource to transmit information to the monitoring processing service component 120. For example, if a collected operations information collection configuration specifies a time interval for transmitting collected operations information, the determination of transmission can be a simple identification of the expiration of the specified time period. In another example, if an operations information collection configuration specifies a specific value of individual monitored operations information (e.g., CPU utilization) or a determined trend (e.g., an extrapolated set of operations information values), the agent 114 utilizes the processing of the operations information in making the determination that a reporting event has occurred. If the determination is made that a reporting event has not occurred, the routine 700 returns to block 702.

If at decision block 706 a determination is made that a reporting event has occurred, at block 708, the virtual machine resource selects a subset of collected operations information for transmission. Illustratively, the agent 114 can transmit all of the collected operations information or a subset of the collected operations information based on the current operations information configuration being implemented by the agent. At block 712, the agent 114 transmits operation information to the monitoring processing service component 120. Additionally, in accordance with the present application, the transmitted operations information includes information identifying the current operations information collection configuration. In one example, the agents may be preconfigured with a set of predefined operations information collection configuration. In this example, the information can include an identifier corresponding to the specific operations information collection configuration. In another example, agents can implement customized collection operations information in which specific operations information and reporting intervals are selected. It this example, the information can include the identification of the template of operations information that are being collected. Other examples or types of identification can also be included within the scope of the present application.

At decision block 712, the virtual machine resource makes a determination whether a responsive message from the monitoring processing service 120 includes a new or updated operations information collection configuration. If not, the routine 700 returns to block 702. Alternatively, if a new or updated configuration has been specified, at block 714, the virtual machine resource parses the acknowledgement and updates the current operations information collection configuration. Illustratively, if the responsive communication from the message processing service 120 includes a request for previously stored collected operations information, at block 714, the virtual machine resource can modify the current operations information collection configuration to identify the additional collected operations information that needs to be transmitted. Alternatively, if the addition of previously stored collected operations information is not part of the collected operations information, the virtual machine resource would independently identify the stored collected operations information and cause the additional information to be transmitted to the message processing service 120 either as part of the next scheduled collected operations information transmission or separately. The routine 700 then returns to block 702 with the updated operations information collection configuration.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for managing collection of operations information comprising:
   transmitting, at a virtual machine resource, operations information, the operations information including at least one collected operations information associated with the virtual machine resource and an identification of a current operations information collection configuration; and
   obtaining, by the virtual machine resource, a communication responsive to the transmission of the operations information, the communication including a new operations information collection configuration based on a determination by a monitoring processing service.

2. The computer-implemented method as recited in claim 1 further comprising parsing the communication response to identify the new operations information collection configuration.

3. The computer-implemented method as recited in claim 1, wherein the new operations information collection configuration corresponds to at least one of an identifier or a template of operations information to be reported.

4. The computer-implemented method as recited in claim 1, wherein the new operations information collection configuration includes a request for at least one a portion of previously stored collected operations information.

5. The computer-implemented method as recited in claim 1 further comprising modifying a local storage of collected operations information based on the new operations information collection configuration.

6. The computer-implemented method as recited in claim 1, wherein the new operations information collection configuration includes an identification of at least one additional operations information to be collected.

7. The computer-implemented method as recited in claim 1, wherein the new operations information collection configuration corresponds to operations information collected responsive to an error condition.

8. The computer-implemented method as recited in claim 1 further comprising maintaining a set of collected operations information in local memory.

9. A computer-implemented method for managing collections of operation information comprising:
   obtaining, by a monitoring processing service, operations information from an agent of a virtual machine resource, the operations information including at least one collected operations information associated with a virtual machine resource and an identification of a current operations information collection configuration; and
   transmitting, by the monitoring processing service, a communication responsive to the transmission of the operations information, the communication including a new operations information collection configuration based on a determination by the monitoring processing service.

10. The computer-implemented method as recited in claim 9, wherein the new operations information collection configuration corresponds to at least one of an identifier or a template of operations information to be reported.

11. The computer-implemented method as recited in claim 9, wherein the new operations information collection configuration includes a request for at least one a portion of previously stored collected operations information.

12. The computer-implemented method as recited in claim 9, wherein the new operations information collection configuration includes an identification of at least one additional operations information to be collected.

13. A system for managing collection of operations information comprising:

at least one first computing device comprising a first processor and a first memory, the at least one first computing device implementing one or more virtual machine resources including applications instantiated on behalf of a customer, wherein individual virtual machine resources generate a set of operations information and store the set of operations information locally; and at least one second computing device comprising a second processor and a second memory, the at least one second computing device implementing a monitoring processing service configured to receive collected operations information and manage operations information collection configurations, wherein individual virtual machine resources of the one or more virtual machine resources are configured to:

transmit, to the monitoring processing service, operations information, the operations information including at least one collected operations information associated with the virtual machine resource and an identification of a current operations information collection configuration; and obtain a communication responsive to the transmission of the operations information, the communication including a new operations information collection configuration based on a determination by the monitoring processing service.

14. The system as recited in claim 13, wherein the individual virtual machine resources are further configured to parse the communication to identify the new operations information collection configuration.

15. The system as recited in claim 13, wherein the new operations information collection configuration corresponds to at least one of an identifier or a template of operations information to be reported.

16. The system as recited in claim 13, wherein the new operations information collection configuration includes a request for at least one a portion of previously stored collected operations information.

17. The system as recited in claim 13, wherein the individual virtual machine resources are further configured to modify a local storage of collected operations information based on the new operations information collection configuration.

18. The system as recited in claim 13, wherein the new operations information collection configuration includes an identification of at least one additional operations information to be collected.

19. The system as recited in claim 13, wherein the new operations information collection configuration corresponds to operations information collected responsive to an error condition.

20. The system as recited in claim 13, wherein the individual virtual machine resources are further configured to maintain a set of collected operations information in local memory.

* * * * *